US008655886B1

(12) United States Patent
Gross (10) Patent No.: US 8,655,886 B1
(45) Date of Patent: Feb. 18, 2014

(54) SELECTIVE INDEXING OF CONTENT PORTIONS

(75) Inventor: Erik Gross, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 108 days.

(21) Appl. No.: 13/072,250

(22) Filed: Mar. 25, 2011

(51) Int. Cl.
*G06F 7/00* (2006.01)
*G06F 17/30* (2006.01)

(52) U.S. Cl.
USPC .......... 707/741; 707/750; 707/748; 707/736; 707/705

(58) Field of Classification Search
None
See application file for complete search history.

(56) References Cited

U.S. PATENT DOCUMENTS

| | | | | |
|---|---|---|---|---|
| 4,972,349 A * | 11/1990 | Kleinberger | ........................ | 1/1 |
| 6,735,583 B1 * | 5/2004 | Bjarnestam et al. | ... | 707/999.002 |
| 7,421,496 B2 * | 9/2008 | Motoyama | ..................... | 709/224 |
| 7,836,037 B2 * | 11/2010 | Renkes et al. | ................. | 707/705 |
| 8,046,832 B2 * | 10/2011 | Goodman et al. | ............ | 709/206 |
| 2002/0059258 A1 * | 5/2002 | Kirkpatrick | .................... | 707/100 |
| 2002/0087500 A1 * | 7/2002 | Berkowitz et al. | ................ | 707/1 |
| 2006/0206462 A1 * | 9/2006 | Barber | .............................. | 707/3 |
| 2009/0271695 A1 * | 10/2009 | Ruellan et al. | ................ | 707/100 |
| 2012/0117096 A1 * | 5/2012 | Massand | ....................... | 707/758 |

* cited by examiner

*Primary Examiner* — Jau-Shya Meng
(74) *Attorney, Agent, or Firm* — Brake Hughes Bellermann LLP (57) ABSTRACT

A request monitor may monitor user requests, each user request including at least one keyword. A portion evaluator may determine inclusive portions of content file portions of indexed content files within an index, and may assign values to the inclusive portions, based on a providing of at least one of the indexed content files to the user in response to the user request. A portion selector may select, from the inclusive portions and based on the values, retained portions to be retained within the index. An index updater configured to update the index to replace the indexed content files with the retained portions.

27 Claims, 5 Drawing Sheets

SELECTIVE INDEXING OF CONTENT PORTIONS

TECHNICAL FIELD

This description relates to content indexing.

BACKGROUND

Information providers seek to provide information consumers with desired information in a manner which is fast, accurate, and efficient, and which makes productive use of available information resources. For example, such information consumers may include network users who wish to access, e.g., over a computer network, desired information which is stored in computer memory. In such scenarios, the information provider may be responsible for providing access to the desired information within the computer memory. In a specific example, the information provider may provide a search engine to the information consumers, e.g., network users. Thus, the network users may submit a search request for the desired information, whereupon the information provider may execute the search with respect to the information stored in the computer memory, and may thereafter provide the desired information to the requesting user.

Often, the user may wish to receive the desired information as quickly as possible. Meanwhile, the amount of information to be searched within the computer memory may be quite large, while the amount of available computer memory itself is nonetheless finite. For these and other reasons, it may be difficult to locate the information desired by the user within an acceptable timeframe, in a manner which optimizes use of the computer memory (and other computing resources of the information provider).

In order to facilitate retrieval of the desired information within an acceptable timeframe, the stored information may be indexed. In general, such indexing may include identifying and/or extracting discrete elements from within the stored information, and then storing each such discrete element along with a reference to the location within the stored information from which the corresponding discrete element was extracted. In a specific example, the stored information may include a plurality of text documents, in which case the documents may be indexed by extracting individual words therefrom, and thereafter storing each word together with a reference to the (location within the) document from which the word was obtained.

At a later time, as referenced above, the information provider may receive a request for desired information from a network user, where the request may include one or more of the words indexed in the manner just described. By comparing the thus-received word(s) with the previously-indexed words, the information provider may quickly determine a location of one or more documents which contain the indexed word. Then, the information provider may provide one or more of the located documents to the user in response to the user's request.

As referenced above, an amount of information to be stored may be very large, i.e., may require a large amount of physical computer memory to store all of the information. Although indexing the stored information advantageously provides faster and more accurate searching thereof, the index itself also must be stored, and thereby adds to the requirements for available memory resources. Moreover, even if sufficient computer memory resources are available to store all the desired information and associated index information, there may be insufficient computing resources to utilize the index and provide the desired information to the user within an acceptable timeframe. Consequently, it may be difficult for information providers and/or information consumers to achieve desired results using conventional indexing techniques.

SUMMARY

According to one general aspect, a computer system may include instructions stored on a computer-readable medium and executable by at least one processor. The computer system may include a request monitor configured to cause the at least one processor to monitor user requests, each user request including at least one keyword. The computer system may include a portion evaluator configured to determine inclusive portions of content file portions of indexed content files within an index, and to assign values to the inclusive portions, based on a providing of at least one of the indexed content files to the user in response to the user request. The computer system also may include a portion selector configured to select, from the inclusive portions and based on the values, retained portions to be retained within the index, and an index updater configured to update the index to replace the indexed content files with the retained portions.

According to another general aspect, a computer program product may be tangibly embodied on a computer-readable medium and may include executable code that, when executed, may be configured to cause a data processing apparatus to determine inclusive portions of content file portions of indexed content files within an index, the inclusive portions associated with at least one keyword of a user request. The executable code, when executed, may be further configured to cause a data processing apparatus to assign values to the inclusive portions, based on a providing of at least one of the indexed content files to the user in response to the user request. The executable code, when executed, may be further configured to cause a data processing apparatus to select, from the inclusive portions and based on the values, retained portions to be retained within the index, and to update the index to replace the indexed content files with the retained portions.

According to another general aspect, a computer-implemented method may include executing instructions stored on a computer-readable medium. The method may include determining, using at least one processor, inclusive portions of content file portions of indexed content files within an index, the inclusive portions associated with at least one keyword of a user request. The method may include assigning values to the inclusive portions, based on a providing of at least one of the indexed content files to the user in response to the user request. The method may further include selecting, from the inclusive portions and based on the values, retained portions to be retained within the index, and updating the index to replace the indexed content files with the retained portions.

The details of one or more implementations are set forth in the accompanying drawings and the description below. Other features will be apparent from the description and drawings, and from the claims.

DETAILED DESCRIPTION

Figure 1:
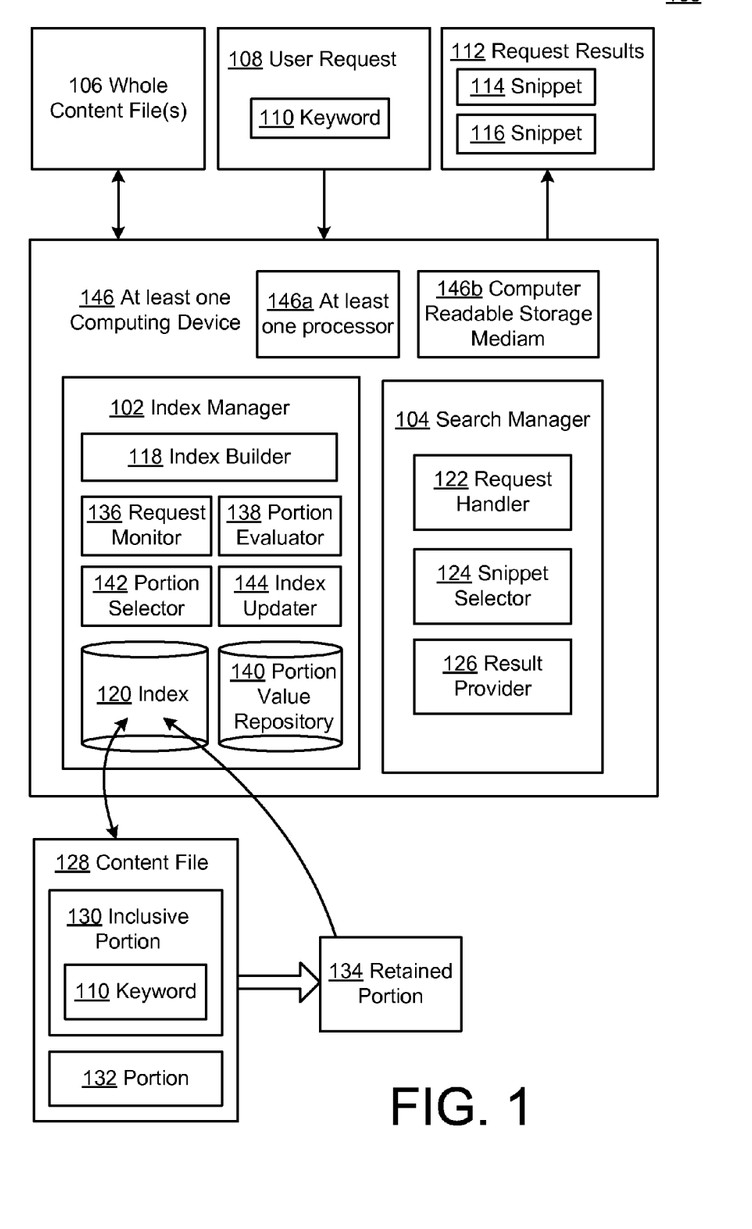
FIG. 1 is a block diagram of a system for selectively indexing content files.

FIG. 1 is a block diagram of a system 100 for selectively indexing content files. In the example of FIG. 1, an index manager 102 may be configured to perform selective indexing, so as to maximize an efficiency and productivity of the indexing process. As a result, as shown and described, the index manager 102 may facilitate an efficient and productive operation of a search manager 104 in executing user-specified searches, based on results of the indexing processes of the index manager 102.

By way of overview of example operations of the index manager 102 and the search manager 104, it may be observed from FIG. 1 that the index manager 102 may be configured to receive whole, entire content files 106, and may be configured to thereafter index some or all of the whole content files 106, as described in detail below, for subsequent use thereof by the search manager 104. In this regard, it may be appreciated that the whole content files 106 may represent virtually any type of information which may be stored using a computer memory. For example, the content files 106 may include text-based documents of any sort, e.g., articles, papers, publications, webpages, or any other content file which primarily or exclusively includes text, where such text may be organized according to virtually any desired or conventional format. More generally, the content files 106 may include virtually any media content, including, e.g., images, video files, audio files, or any combinations thereof. Other examples of content files 106 would be apparent to one of skill in the art, and therefore are not described here in detail, except as may be necessary or helpful in understanding the operations of the system 100 of FIG. 1.

Based on results of the indexing of the content files 106 by the index manager 102, the search manager 104 may receive one or more user requests, conceptually represented in FIG. 1 as a user request 108. As is well known, the user request 108 may include one or more keywords 110 which are provided by the user, and which are thought by the user to be included in, or associated with, information desired to be received by the user.

For example, in a particular implementation of the system 100 of FIG. 1, the search manager 104 may include (or be associated with) a search engine. In this case, the user may enter the user request 108 including the keyword 110 into a webpage or other portal provided by the search manager 104. Thus, as is well known, the user request 108 may be provided over a computer network, and/or may be provided with respect to a local computing device.

Upon receipt of the user request 108, the search manager 104 may utilize indexing operations of the index manager 102 in order to identify one or more particular content files from the content files 106 which are thought to be most desirable to the user. Specifically, as shown in the example of FIG. 1, the search manager 104 may provide search request results 112 to the user. In the example of FIG. 1, the request results 112 include a snippet 114 and a snippet 116 which include selected portions of the content files of the content files 106 which are extracted or identified by the search manager 104 for provision to the user in response to the user request 108.

As is well known, the snippets 114, 116 may include, or be associated with, links to the underlying content files from which the snippets 114, 116 were extracted or identified. Consequently, the user may select a desired snippet (or associated link), and thereby obtain access to a desired content file.

As referenced above, and as would be appreciated by one of skill in the art, the use of the user request 108 and associated keyword 110 in providing request results 112, by itself, is generally well known. In this regard, as also referenced above, the index manager 102 may include an index builder 118 which is configured, among other features as described in detail herein, to execute various conventional indexing functionalities. For example, the index builder 118 may initially receive the content files 106, and may analyze the content files 106 to construct an index 120 to be used by the search manager 104 in providing the request results 112 in response to the user request 108.

Specifically, for example, the index builder 118 may receive or otherwise obtain a particular content file of the whole content files 106, and may analyze the particular content file to identify particular words, images, or other elements thereof which are thought to be potentially useful in constructing the index 120. That is, the index builder 118 may extract such discrete elements (e.g., words, phrases, or images), based on a goal of indexing the particular content file within the index 120 in a manner which facilitates efficient and productive execution of the search manager 104 in providing the request results 112.

For example, in an initial, conventional operation of the index builder 118, the index builder 118 may index an entirety of each content file of the whole content files 106. That is, for example, the index builder 118 may extract each word (or each unique word) from a text-based document of the whole content files 106, and may store each extracted word within the index 120, in association with an identification of (and/or other information about) the content file from which each extracted word was obtained.

In various examples of such operations, it may be appreciated that the index builder 118 may store an entirety of each of the whole content files 106 within, or in association with, the index 120. In other examples, however, the index 120 may merely include a reference (e.g., hyperlink) to a storage location of a corresponding content file (e.g., which may be located elsewhere within an associated computer network). In conventional examples, the index builder 118 may ignore words or other elements which are thought to be of suboptimal use to the search manager 104 in providing the request results 112. For example, the index builder 118 may ignore words such as articles (e.g., a, and, the), or other very common words which are not thought to contribute to accurate production of the request results 112. In other examples, the index builder 118 may truncate later portions of the whole content files 106, such as, for example, when a particular one of the whole content files 106 is exceedingly lengthy.

In operation, then, the search manager 104 may include a request handler 122 which receives the user request 108. As referenced above, the request handler 122 may include, or be associated with, a search engine which is configured to utilize the keyword 110 to access the index 120 and to thereby identify indexed content files of the whole content files 106 which include, or are associated with, the keyword 110.

As may be appreciated, operations of the request handler 122 in utilizing the keyword 110 and the index 120 to provide the request results 112, by themselves, are well known, and are not described here in further detail. Similarly, the search manager 104 may include a snippet selector 124 which may be configured to examine content files identified by the request handler 122 as including the keyword 110, and to thereafter extract corresponding snippets 114, 116 for inclusion within the request results 112. Then, a result provider 126 may be configured to provide the request results 112, including the snippets 114, 116. Thereafter, the result provider 126 may ultimately provide, or provide access to, a particular content file which is desired by the user, as expressed by selection by the user of a corresponding snippet, (e.g., the snippet 114).

Many other aspects and features of operations of the search manager 104 are well known, and would be apparent. For example, in a context where the search manager 104 receives the user request 108 and provides the request results 112 over the Internet or other network, it would be appreciated that the request results 112 may be provided in, or using, appropriate browser software, i.e., the same browser software used to receive the user request 108. In this regard, the search manager 104, e.g., the result provider 126, may provide the request results 112 over a plurality of webpages. For example, the result provider 126 may provide an initial subset (e.g., 10 or 25) of obtained snippets within the first page of a set of webpages within the web browser, and may provide a second set of snippets within a second page. Further, as is well known, the snippets 114, 116 included in the various webpages may be arranged in an order which is thought to correspond to a likelihood that a given snippet matches a desired result of the user, i.e., accurately fulfills the user request 108.

In practice, as referenced above, the index 120 may be stored using one or more computer memories, where such computer memories may be associated with finite or limited computing resources. For example, a size of the computer memory may be limited. In other examples, even if a size of the computer memory is effectively limitless, it may become impractical to use available processing resources to search the computer memory to obtain the request results 112 within a timeframe that is acceptable to the user.

Moreover, it may occur that of the whole content files 106, each particular content file may include only some particular portions which actually contribute to inclusion of the associated content file within the request results 112. Therefore, as described in detail herein, the index manager 102 may be configured to index only those portions which are sufficiently likely to contribute to future user requests. In this way, a lesser amount of information is stored within a computer memory associated with the index 120, so that a greater number of content files 106 may be indexed in an effective manner, and/or so that, given a certain amount of computing resources, indexed content files may be retrieved by the search manager 104 in a sufficiently timely manner for inclusion within the request results 112.

More specifically, the example of FIG. 1 illustrates a specific content file 128 of the content files 106. That is, as may be appreciated from the above discussion, the content file 128 may initially represent the entirety of a content file of the content files 106, which is initially indexed by the index builder 118 for inclusion of the corresponding index results within the index 120.

Subsequently, the content file 128 may be considered to include a plurality of portions 130, 132. That is, using one or more of the various methods described herein, content of the content file 128 may be separated into discrete or separate subsets, referred to herein as portions. For example, in a situation where the content file 128 includes text, then the portions 130, 132 may include fractions of the text. Many examples are provided in detail below, or would be apparent, and may include, for example, specific sentences, paragraphs, or other sequential strings of text. In other examples, the portions 130, 132 may be associated with, or defined by, one or more snippets used by the search manager 104, as discussed above with respect to snippets 114, 116. In examples where the portions 130, 132 include image, video, and/or audio portions of a multi-media version of the content file 128, then the portions 130, 132 may be defined in a manner appropriate to the particular type of content.

As described in detail above, the search manager 104 may receive the user request 108, including the keyword 110. Thereafter, as described, the search manager 104 may utilize the keyword 110 in conjunction with the index 120 to provide the request results 112. Specifically, as shown with respect to the content file 128, the search manager 104 may identify the keyword 110 within the index 120, and may thereby identify the content file 128 as including the keyword 110. Moreover, as shown in FIG. 1 and as just referenced above, the index manager 102 may be configured to recognize that the keyword 110 is included within the portion 130 of the content file 128. Therefore, for purposes of clarity and convenience, the portion 130 is illustrated in FIG. 1 and referred to hereafter as an inclusive portion, because it includes the keyword 110.

Thus, it may be observed that only the inclusive portion 130, in the example of FIG. 1, includes the keyword 110 and therefore contributes to identification of the content file 128 as being associated with the user request 108. In other words, in the example, the portion 132 did not contribute to identification of the content file 128 as being associated with the user request 108 and included within the request results 112. In this sense, the portion 132 was therefore needlessly indexed and/or stored, and therefore represents a drain on resources of the system 100.

Consequently, as described in detail herein, the index manager 102 may be configured to identify the inclusive portion 130 as contributing to inclusion of the content file 128 within the request results 112, and may therefore retain the inclusive portion 130 as a retained portion 134 within, or associated with, the index 120. Meanwhile, the index manager 102 may delete or otherwise discard the portion 132 and any associated index information stored within the index 120. In this way, it is apparent that a lesser amount of information is stored within the index 120, so that the index 120 may be implemented and used in a more effective and efficient manner.

In more detail, the index manager 102 may include a request monitor 136 which may be configured to continuously or periodically monitor some or all requests received by the request handler 122 (e.g., the user request 108 and associated user requests). The request monitor 136 may perform initial filtering or other processing of monitored user requests, e.g., in order to identify user requests which are thought to be useful in managing the index 120 in the manner just described.

The request monitor 136 may further be configured to provide the monitored user request(s) to a portion evaluator 138. For example, the request monitor 136 may continuously provide user requests to the portion evaluator 138. In other examples, the request monitor 136 may store the user requests temporarily, and thereafter provide some or all of the stored user requests to the portion evaluator 138 in a batch process.

The portion evaluator 138 may be configured to identify specific portions of each indexed content file within the index 120. As described herein, the portion evaluator 138 may identify such portions prior to receipt of any user request (e.g., in conjunction with indexing processes of the index builder 118), and/or may be configured to identify the portions of the various content files based at least in part on the user request themselves and/or based on the providing corresponding request results 112 (e.g., based on operations of the snippet selector 124).

Thus, as referenced above and shown in FIG. 1, the portion evaluator 138 may be configured to identify the portions 130, 132 within the content file 128. Although in the simplified example of FIG. 1, the content file 128 only includes the two portions 130, 132, it may be appreciated that the portion evaluator 138 may divide the content file 128 into any appropriate or desired number of portions. Moreover, it may be appreciated that the portions 130, 132 may not represent sequential or otherwise connected or contiguous elements of contents of the content file 128. For example, the portions 130, 132 may be defined by similarity of content or other criteria, rather than, or in addition to, whether the content of the portion in question is continuous or contiguous.

Thus, it may be appreciated that operations of the index manager 102, including the request monitor 136 and the portion evaluator 138, may proceed in conjunction with, e.g., in parallel with operations of the search manager 104. That is, as described, the index builder 118 may execute an initial or original indexing of the whole content file 106 within the index 120, whereupon the search manager 104 may begin to receive user requests 108 and thereafter provide corresponding request results 112. At the same time, the request monitor 136 may monitor such operations of the search manager 104, and may provide the results of such monitoring to the portion evaluator 138.

At such time, the portion evaluator 138 may identify those portions of the content file 128 (or other content file in question) which include or are otherwise associated with the keyword 110 of the particular user request 108. In the simplified example of FIG. 1, only the two portions 130, 132 are illustrated, and only the inclusive portion 130 includes the single keyword 110. In practice, however, it may occur that the user request 108 includes a number of keywords. Moreover, it may occur that the content file 128 includes a relatively large number of portions, anyone of which may include one or more of such a plurality of keywords, or subsets or combinations thereof.

Therefore, the portion evaluator 138 may be configured to analyze some or all of the inclusive portions of the content file 128, and to provide a value to, or otherwise evaluate, each such inclusive portion. Various examples are provided in more detail below, but, generally speaking, it may be appreciated that various criteria may be established for evaluating each inclusive portion. For example, a higher value may be assigned to an inclusive portion which includes a large percentage or all of a plurality of keywords of the user request, as compared to an inclusive portion which includes fewer or a single one of the plurality of keywords.

Further, given that, as described above, the request monitor 136 is configured to monitor a plurality of user requests over a period of time, the portion evaluator 138 may evaluate inclusive portions of the content file 128 using a plurality of user requests. For example, if a plurality of user requests includes the same or overlapping keywords, then the portion evaluator 138 may associate a higher value with inclusive portions of the content file 128 which include such keywords. Additional examples of operations of the portion evaluator 138 in assigning values to inclusive portions of the content file 128 are described in detail below, or would be apparent.

In operation, the portion evaluator 138 may be configured to continuously update current evaluations of the various portions of associated content files, using, in the example of FIG. 1, a portion value repository 140. That is, the portion value repository 140 may store a value for, and in associated with, each inclusive portion of each content file which is evaluated by the portion evaluator 138 and designated for storage within the portion value repository 140.

For example, in the simplified scenario of FIG. 1, the request monitor 136 may detect receipt of the user request 108. The portion evaluator 138 may define the portions 130, 132 within the content file 128, as described. The portion evaluator 138, in conjunction with the request monitor 136, may determine that the keyword 110 is included within the inclusive portion 130, and therefore contributed to inclusion of the content file 128 within the request results 112. The portion evaluator 138 may thus assign a value of "1" to the inclusive portion 130, while assigning a value of "0" to the portion 132, where the latter portion, as described, did not contribute to inclusion of the content file 128 within the request results 112. Thus, the value of "1" may be stored within the portion value repository 140 in association with the inclusive portion 130.

Over time, as additional user requests are received and monitored by the request monitor 136, it may occur that the keyword 110 is included within a second or subsequent user request, so that the portion evaluator 138 may increase or increment a value associated with the portion value 130 within the portion value repository 140. In some implementations, the portion 132 may be referenced within the portion value repository 140, and explicitly identified as having a value of "0". In other implementations, the portion evaluator 138 may not store any value associated with the portion 132, until if and when one or more keywords are included within the portion 132, so that the portion 132 is associated with a positive value within the portion value repository 140.

Thus, over time and in the context of a plurality of user requests, various portions 130, 132 of the content file 128 may be associated with corresponding values within the portion value repository 140. At a designated time, or in response to a designated circumstance, a portion selector 142 may designate or otherwise select those inclusive portions referenced with the portion value repository 140 which have a sufficiently high value to merit retention thereof as, e.g., the retained portion 134, within the index 120.

For example, as just described, over time a plurality of portions 130, 132 of the content file 128 may be recognized as being inclusive portions with respect to one or more user requests received by the search manager 104 and monitored by the request monitor 136. In other words, the portion value repository 140 may include a range or distribution of values associated with corresponding inclusive portions of corresponding content files indexed within the index 120. Therefore, the portion selector 142 may be configured to select particular inclusive portions, such as those inclusive portions associated with the value above a threshold value, i.e., those inclusive portions having the highest values and therefore being most likely to have contributed to inclusion of corresponding content files within various request results provided by the search manager 104.

As a result, those inclusive portions selected by the portion selector 142 may be designated as retained portions, e.g., the retained portion 134, and thereafter such retained portions may replace the previously stored portions of the corresponding content file within the index 120. For example, in the example of FIG. 1, an index updater 144 may be configured to replace all data related to a storing and/or indexing of the content file 128 with data related to the storing/indexing of only retained portions thereof, e.g., the retained portion 134.

In this way, as described, the index 120 may initially or originally contain an indexing of all or a substantial portion of the entirety of each content file of the whole content files 106.

Over time, however, the indexing of content files 106 may be restricted to indexing only retained portions of the various content files which are found to be the most useful and/or the most likely in causing the corresponding content file to be included within results provided in response to a user request. In this way, computer memory and other computing resources associated with implementation and use of the index 120 may be utilized in a more efficient and productive manner, and an experience of the user of the system 100 may be enhanced.

In the example of FIG. 1, the index manager 102 and the search manager 104 are illustrated as executing on at least one computing device 146. As shown, the at least one computing device 146 may include at least one processor 146A, as well as computer readable storage medium 146B. Thus, as it would be apparent to one of skill in the art, and as discussed generally in more detail below with respect to FIG. 5, data and instructions may be stored using the computer readable storage medium 146B, and may be read and/or executed using the at least one processor 146A. For example, instructions for implementing functionality of the index manager 101 may be stored using the computer readable storage medium 146B, and executed by the at least one processor 146A. Similarly, contents of the index 120 and/or the portion value repository 140 may be stored using the computer readable storage medium 146B, so that contents thereof may be accessed by the at least one processor 146A in conjunction with executing instructions defining functionality and operation of the index manager 102 and the search manager 104.

As shown, various components and elements of the system 100 of FIG. 1 are illustrated as separate and discrete components. However, it will be appreciated that functionality of any two or more of the components of the system 100 may overlap or be combined for execution by a single component. Conversely, any given component of the system 100 may be further separated for distinct execution of the corresponding functionalities. Moreover, any single element of the system 100 may be executed using two or more corresponding elements. For example, the index 120 may be executed using two or more computer memories.

As would be further appreciated, various subsets of the components of the system 100 may be separately executed using two or more underlying hardware platforms. For example, the index 120 may be stored using a first computing device, while the remainder of the index manager 102 may be executed using a second computing device. In such examples, the various computing devices may be remote from one another and connected over a network (e.g., in the example just given, the index 120 may be stored remotely from a remainder of the index manager 102).

Additional or alternative implementations of the system 100 of FIG. 1 are described below in detail. For example, the index 120 may represent a relatively fast and expensive memory utilized as the index 120, and implemented using the techniques described above with respect to the system 100 in order to optimize a use thereof. That is, as described, the index 120 may be optimized by storing only the retained portion 134 and similar retained portions which are the most useful in fulfilling the user request 108. At the same time, a relatively slower and less expensive computer memory and associated platform may be used to implement a second index (not explicitly illustrated in FIG. 1) which may be used to store and/or index an entirety of the whole content files 106 (or at least, to store/index larger and more comprehensive portions of the whole content files 106 then the retained portions 134 as stored in the index 120). Many other variations of, additions to, or alternatives to the system 100 of FIG. 1 are described below, or would be apparent.

Figure 2:
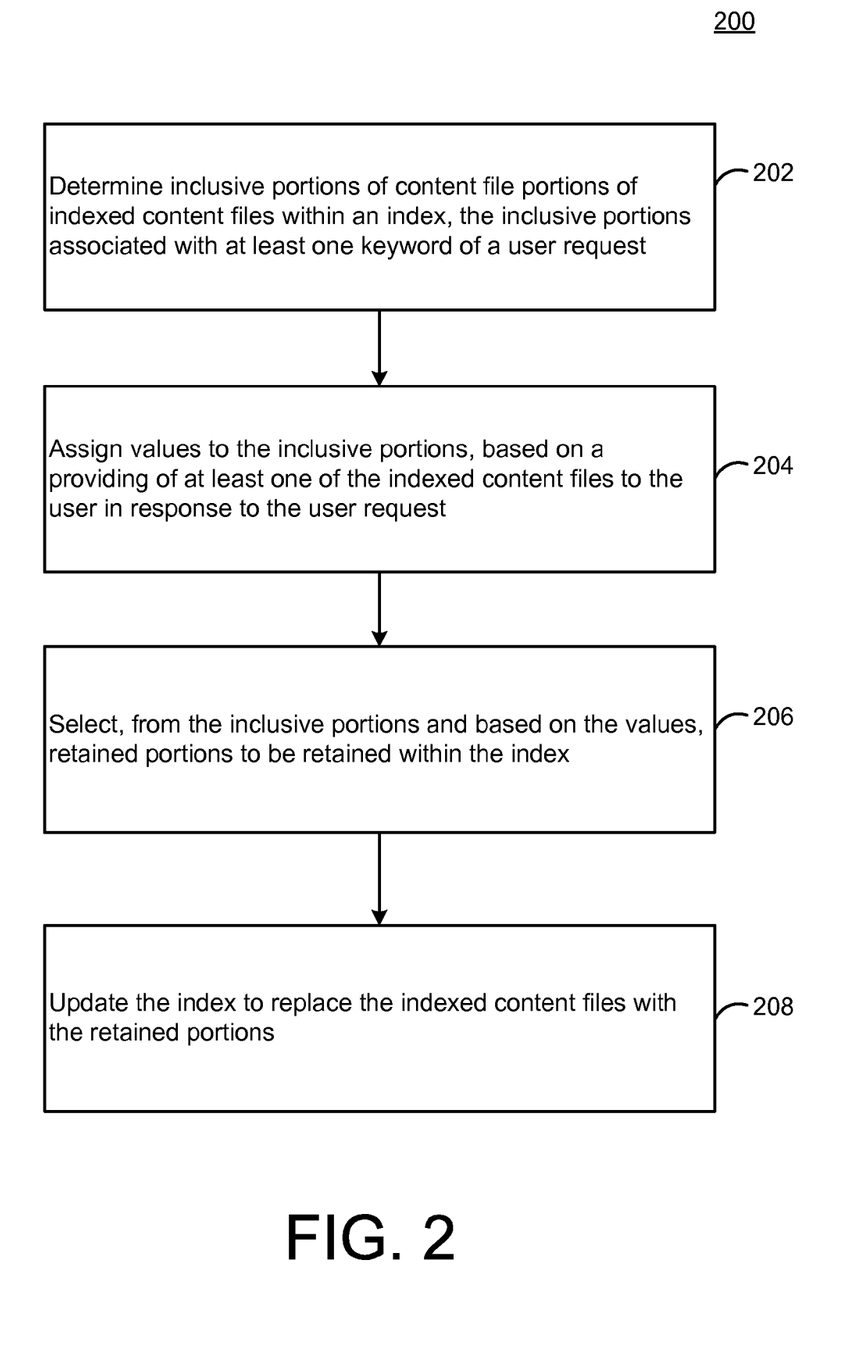
FIG. 2 is a flowchart illustrating example operations of the system of FIG. 1.

FIG. 2 is a flowchart 200 illustrating example operations of the system 100 of FIG. 1. In the example of FIG. 2, operations 202-208 are illustrated as discrete, sequential operations. However, it will be appreciated that FIG. 2 is merely an example, and that many other implementations of the illustrated operations, and related operations, may be implemented. For example, two or more of the operations 202-208 may be executed in an overlapping or entirely parallel fashion. In other examples, two or more of the operations 202-208 may be executed in a different order than that shown. Further operations (not explicitly illustrated in FIG. 2) may be added to the operations 202-208, or may replace some or all of one or more of the operations 202-208.

In the example of FIG. 2, inclusive portions of content file portions of indexed content files within an index may be determined, the inclusive portions associated with at least one keyword of a user request (202). For example, as described above, the request monitor 136 may monitor user request(s) 108, including one or more keywords 110, as received by the search manager 104 and processed thereby using the index 120, in order to provide the request results 112. As described, upon determination of the content file 128 as being responsive to the user request 108 and/or included in the request results 112, the portion evaluator 138 may determine that, of the portions 130, 132, the portion 130 is inclusive of the keyword 110, and was therefore instrumental in identifying the content file 128 as being responsive to the user request 108 and/or included in the request results 112.

In the examples provided herein, the inclusive portions are generally described as including the relevant keyword(s). However, it may be appreciated that, in additional or alternative embodiments, the inclusive portions may be otherwise associated with the corresponding/relevant keyword(s). For example, the index builder 118 of FIG. 1 may be configured to index keywords within the index 120 in association with indexing of corresponding synonyms, related words or phrases having similar meanings or appearing in similar contexts, common/potential misspellings of the keyword, or using any other content which is determined to correspond to a keyword being indexed or other otherwise assist in providing better, more meaningful request results 112. For example, the index builder 118 may index the word "airplane" in conjunction with synonyms such as "jet," or "plane," and may similarly perform indexing based on possible misspellings, such as "aerplane." Similarly, phrases such as "big airplanes" may be indexed in conjunction with corresponding phrases, such as "large airplanes." Consequently, the above-described components of FIG. 1, e.g., the portion evaluator 138 and the index updater 144, may be configured to select and store the retained portion 134 based on the use of such indexing techniques with respect to the keyword 110. For example, the portion evaluator 138 may determine that that the inclusive portion 130 includes a related, indexed keyword 110' (not explicitly illustrated in FIG. 1) which may be, e.g., an indexed synonym of the keyword 110. Thus, the inclusive portion 130 may be determined and evaluated as such, based on such an association with the keyword 110 (e.g., inclusion of the keyword synonym 110').

Values may be assigned to the inclusive portions, based on a providing of at least one of the user content files to the user in response to the user request (204). For example, as just referenced, the portion evaluator 138 may assign a value to the inclusive portion 130, based on the providing of the content file 128 to the user within the request result 112. Various techniques for assigning the value to the inclusive portion 130 are described herein.

Retained portions to be retained within the index may be selected from the inclusive portions, based on the values (206). For example, the portion selector 142 may determine that the inclusive portion 130 has a positive, non-zero value, while the portion 132 has a zero value, and may therefore retain the inclusive portion 130 of the retained portion 134. Of course, as described herein, FIG. 1 merely provides a simplified example for the sake of illustration. In practice, the content file 128 may include a number of inclusive portions and a number of non-inclusive portions. Consequently, the portion selector 142 may be configured to select those inclusive portions of the entirety of inclusive portions having the highest values assigned by the portion evaluator 138. For example, as described herein, the portion selector 142 may determine a threshold for values of the inclusive portions, and may then access the portion value repository 140 to select all inclusive portions having values higher than the threshold. As further described herein, the threshold may be adjusted dynamically in order to further optimize utilization of the index 120.

The index may be updated to replace the index content files with the retained portions (208). For example, the index updater 144 may be configured to replace all data related to a storing and/or indexing of the content file 128 with data related to the storing/indexing of only the retained portion 134. In this way, as described, the index 120 may be optimized in that the index 120 may thus provide a vast majority or all of the functionalities and advantages of conventional implementations of the index 120, while requiring substantially fewer computing resources to do so.

Figure 3:
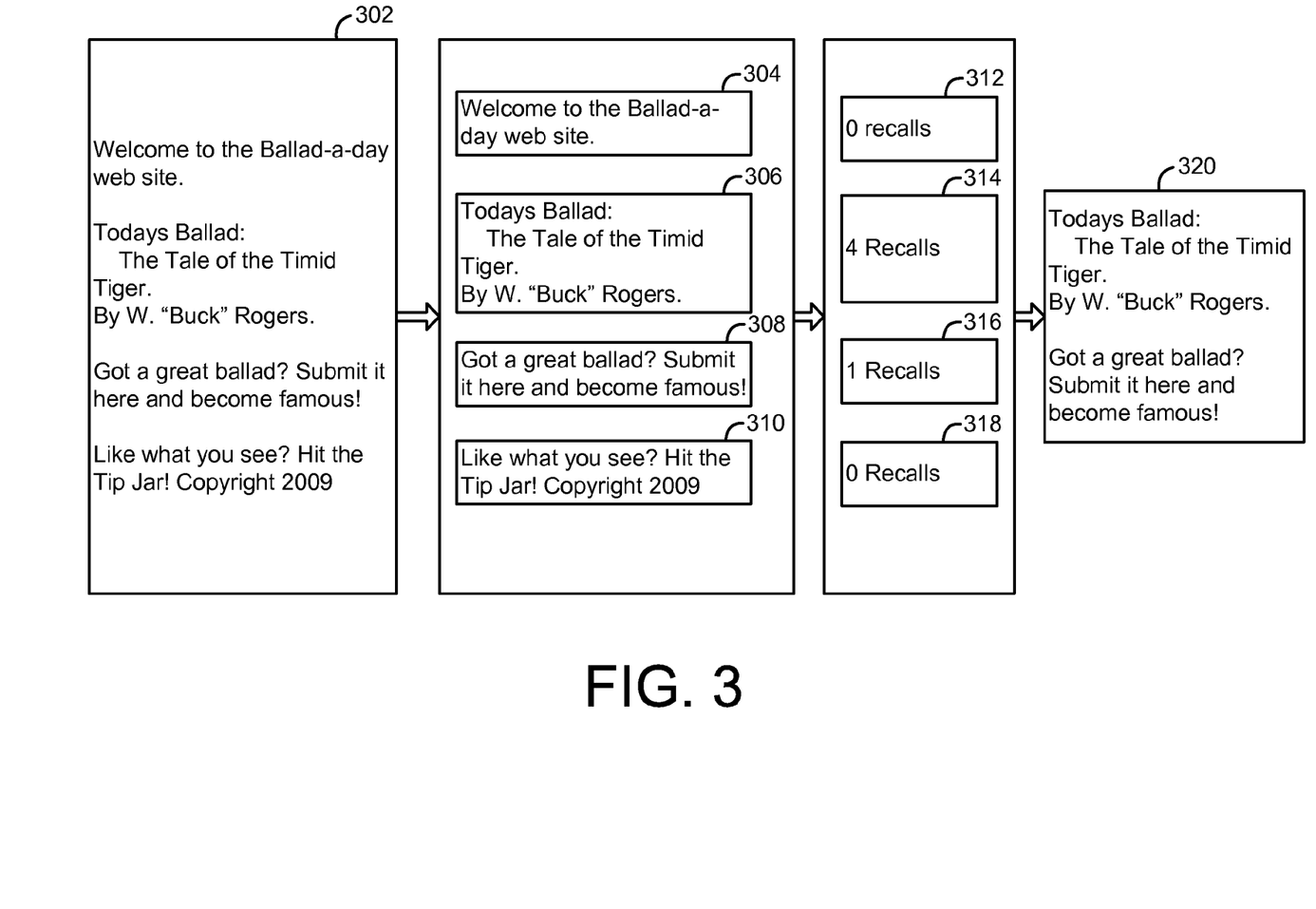
FIG. 3 is a block diagram illustrating selective indexing of a web document.

FIG. 3 is a block diagram illustrating a specific execution of the system 100 of FIG. 1, using the operations of the flowchart 200 of FIG. 2. Specifically, as shown, FIG. 3 illustrates a specific example in which the content files 106 include text-based web documents, which are indexed by the index manager 102 for associated searching thereof by the search manager 104 in response to the user request 108, to thereby provide the request results 112. Thus, FIG. 3 illustrates an example web document 302, corresponding conceptually to the content file 128 of FIG. 1. As shown, the web document 302 includes various sequential pieces of text.

In association with indexing of the web document 302 during an initial or original indexing thereof by the index builder 118, the portion evaluator 138 may identify portions 304, 306, 308, 310 of the web document 302. Thus, the portions 304-310 correspond conceptually to the portions 130, 132 of the content file 128 of FIG. 1.

As shown in the simplified example of FIG. 3, the portions 304-310 each correspond generally to a paragraph of text within the web document 302 (i.e., respectively to each of the paragraphs, "Welcome to the Ballad-a-day web site.", "Todays Ballad: The Tale of the Timid Tiger. By W. "Buck" Rogers", "Got a great ballad? Submit it here and become famous!", and "Like what you see? Hit the Tip Jar! Copyright 2009."). Of course, as described herein, the portions 304-310, or other portions, may be defined using various techniques. For example, the portions 304-310 may correspond generally to any continuous or contiguous section of the text of the web document 302, and therefore may be defined as including a certain number of words, or as comprising a certain fraction of the overall document 302.

In these and other examples, the portion evaluator 138 may thus be enabled to define the portions 304-310 in conjunction with indexing of the document 302, e.g., and prior to any search request received by the search manager 104. In other examples, however, as referenced herein, the portions 304-310 may be defined and/or updated over time based at least in part on searches executed by the search manager 104. In particular, as referenced above, searches executed by the search manager 104 may include selection of snippets 114, 116 by the snippet selector 124. Therefore, operations of the snippet collector 124 may be leveraged to define or modify the portions 304-310 of the web document 302. For example, portions of the web document 302 may be defined as including a certain number of words before and after one or more snippets selected by the snippet selector 124 when providing the web document 302 within the request results 112.

In the example of FIG. 3, however, it is assumed for the sake of simplicity that the portions 304-310 are predefined in a static manner by the portion evaluator 138, in the manner specifically illustrated in the example of FIG. 3. Subsequently, as described, the search manager 104 may proceed with execution of a number of searches.

In the example of FIG. 3, the search manager executes 5 total searches. That is, the request handler 122 may receive 5 user requests 108, each including one or more keywords 110. For example, the request handler 122 may receive the first user request 108A which includes the word "famous." The result provider 126 may use the index 120 to associate the word "famous" with the web document 302, and thereby may include the web document 302 within the request results 112. Specifically, as described, the snippet collector 124 may select some or all of the portion 308 of the snippet 114 to be included within the webpage illustrating the request results 112, so that the user providing the user request 108A may thereby select a link within or associated with the snippet 114 to thereby obtain the web document 302. Thus, the portion evaluator 138 may recognize, based on information received from the request monitor 136 in monitoring actions of the search manager 104 in executing the just-described search, that the portion 308 includes a keyword which has contributed to provision of the web document 302 within the request results 112.

Similarly, the search manager 104 may receive 4 additional user requests 108B-108E. Each such user request may include one or more keywords which are included within the portion 306. Consequently, as just described with respect to the portion 308, the portion evaluator 138 may recognize that the portion 306 has contributed to the recall of the web document 302, and inclusion thereof with the request results 112, during each of the 4 searches corresponding to user requests 108B-108E.

Thus, the portion evaluator 138 may assign values to the portions 304-310 as described above. For example, as shown, the portion evaluator 138 may store such values within the portion value repository 140 in direct relation to corresponding portions 304-310. Specifically, as shown, the portion evaluator 138 may store values 312, 314, 316, and 318 within the portion value repository 140 in direct relationship with corresponding portions 304, 306, 308, and 310.

In the simplified example in FIG. 3, the portion evaluator 138 simply increments any one of the values 312-318 associated with a portion 304-310 which is determined to be an inclusive portion, i.e., which is determined to include one or more keywords of the corresponding one of the search user requests 108A-108E. Specifically, as shown, the value 314 is equivalent to 4, reflecting the 4 times that the portion 306 was an inclusive portion during the 5 searches. Meanwhile, the value 316 is incremented to a value of 1, based on the single time that the portion 308 was an inclusive portion with respect to the 5 searches.

At a conclusion of the 5 searches, the portion selector 142 may thus be configured to select the portions 306 and 308 corresponding to the values 314, 316 as being inclusive portions having values which are above the threshold (e.g., in the example of FIG. 3, having a positive or non-zero value). Thereafter, the portions 306 and 308 may be retained as retained portions 320, corresponding conceptually to the retained portion 134 of FIG. 1. Thus, the index updater 144 may update the index 120 to replace storage and indexing data associated with the web document 302 with storage and indexing data related to the retained portion 320. In this way, as described, the index 120 may be utilized in an efficient and productive manner.

Figure 4:
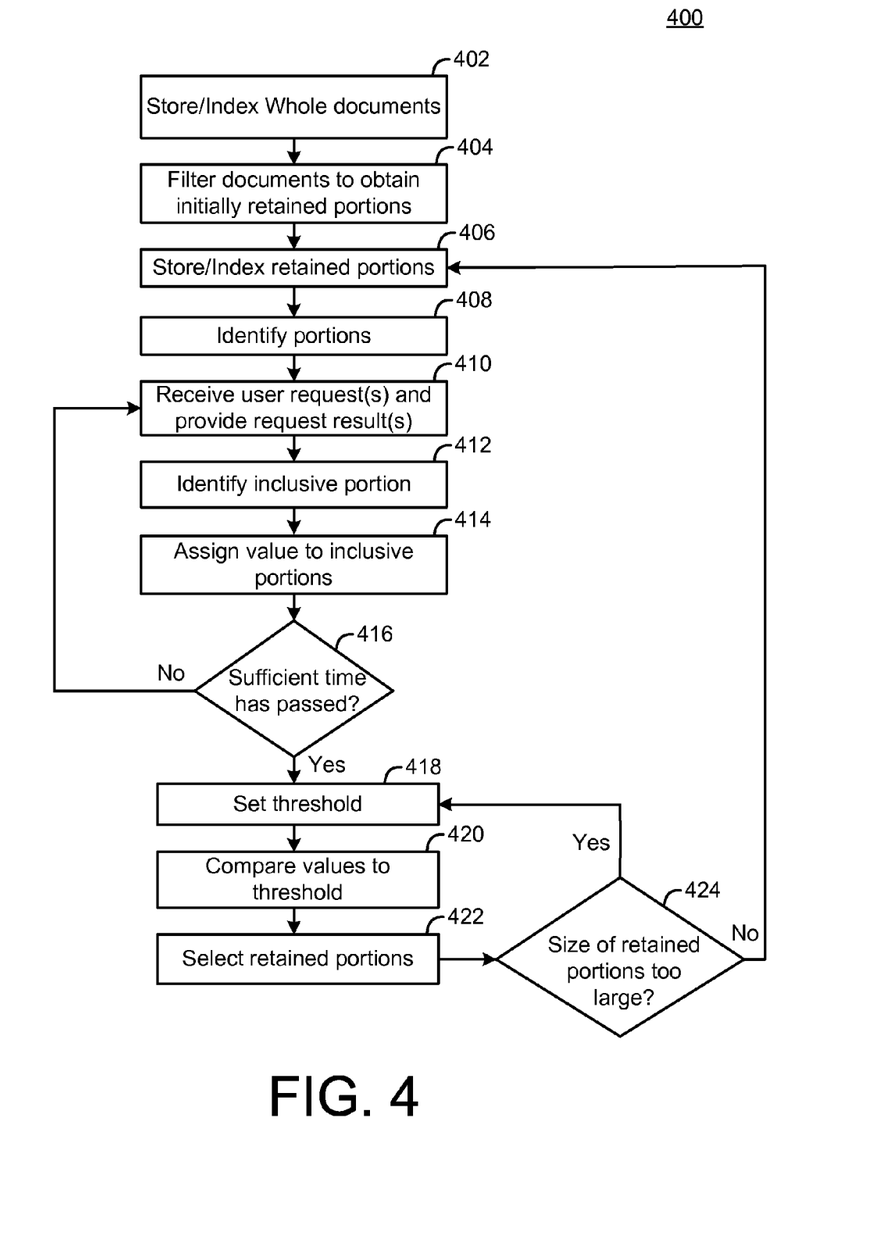
FIG. 4 is a flowchart illustrating more detailed examples of operations of the system of FIG. 1.

FIG. 4 is a flowchart 400 illustrating various additional or alternative operations for 402-424 of the system 100 of FIG. 1. In the example of FIG. 4, it is generally assumed that the content files 106 include documents, such as the document 302 in the example of FIG. 3. However, as described herein, such documents or other content files should be understood to potentially include text, audio, video, or image data, depending upon particular implementations of the flowchart 400.

In the example of FIG. 4, whole documents may be stored and/or indexed in their entirety (402). In conjunction with such storing and indexing, however, it may be appreciated that the documents may be filtered in order to obtain initially-retained portions (404). For example, as referenced above, the index builder 118 may index all of the various content files 106. At the same time, however, the index builder 118 may be configured to recognize that some or all of the entirety of one or more of the documents may be filtered out prior to any storage or indexing thereof. In the example given above, for example, the index builder 118 may simply select an initial or a first portion of some or all of the various documents for inclusion within the indexing 120. For example, the index builder 118 may select a first or initial portion of each document which is defined as including any specific number of words, or may be defined as including a specific fraction of the overall document. In some cases, the index builder 118 may perform such filtering only when a given document is over a certain size limit.

In additional or alternative examples of such initial filtering, the index builder 118 may execute additional or alternative filtering operations. For example, the index builder 118 may select and include for indexing a last, final, or concluding portion of a given document. That is, similarly to the above example, the index builder 118 may select such a final or concluding portion of a given document as including a certain number of words, or as comprising a particular fraction of the overall document in question.

In still other examples, the index builder 118 may perform an initial analysis of a given document to determine words within the document which contain a high ratio of term frequency (TF) to inverse document frequency (IDF). In this context, term frequency simply refers to a number of times that a given term, (e.g., word or phrase) appears within the document in question, while the inverse document frequency refers to a perceived or actual overall rarity or uniqueness of terms. That is, the inverse document frequency is simply an inverse of a frequency with which a given term appears across a plurality of documents. Thus, the ratio of the term frequency to the inverse document frequency identifies an extent to which a rare term appears within a document, on the premise that the high frequency of such a rare term may indicate utility of the term in operations of the index manager 102 and/or the search manager 104.

In yet another example of potential filtering operations of the index builder 118, the index builder 118 may construct and/or access templates which include or exclude certain identifiable features of the documents in question. For example, the documents may include web documents which are known to include certain types of sections or sub-sections. For example, video clips or published articles may be known to include comments about a corresponding video clip or a published article. In such a case, a template may be constructed which includes or excludes a comment, depending upon a desire of an operator of the index manager 102. In such cases, the index builder 118 may apply such templates to documents of the content files 106, and thereafter index only those portions which are not filtered out by the corresponding template.

Once such initially retained portions are obtained by the index builder 118, the retained portions subsequent to filtering may be stored and/or indexed (406), e.g., by the index builder and/or the index updater 144. The portion evaluator 138 may then proceed with identifying portions of the thus-stored and indexed documents within the index 120 (408). As referenced and illustrated above with respect to the example of FIG. 3, one technique for identifying portions of each document includes constructing a histogram in which each portion constitutes a section or "bucket" of the histogram. That is, in the example of FIG. 3, the portions 304-310 constitute buckets of the histogram in which each bucket is defined by a paragraph of text of the underlying web document 302, so that values 312-318 of the corresponding buckets 304-310 may be sequentially incremented in the manner described above.

As referenced with respect to FIG. 3, virtually any sequentially or otherwise related text may be selected as a unit or bucket of the histogram. For example, the histogram may include one bucket per sentence, per paragraph, per defined number of words, or per word. Other criteria may be established. For example, in the example given above in which comments are included in association with an associated video clip or published article, then one bucket of the histogram may be constructed for each comment or set of comments.

The search manager 104 may proceed with receiving user request 108 and providing corresponding request results 112 (410). In the example of FIG. 4, identification of portions is illustrated as occurring prior to receipt of user request in corresponding providing of the request results. However, as referenced above, it may occur that the portions are identified subsequent to receipt of one or more of the user requests. In other examples, portions may be identified in conjunction with, or in parallel with, the receipt of the user request 108 and subsequent provision of the request results 112. In some examples, the portions may be identified or modified based in whole or in part upon the user request 108 and/or the request results 112. (For example, as referenced above, the portions may be defined or modified based on content of snippets provided in the request results 112).

Inclusive portions of the portion of the various index content files may thus be determined (412). For example, the portion evaluator 138 may identify any of the various portions which include one or more of the keywords 110 of the user request 108, or which include synonymous words/phrases of the keyword(s) 110, and/or common misspellings of the keyword(s) 110. Other criteria for defining/differentiating inclusive portions relative to the underlying portions may be established. For example, the portion evaluator 138 may be configured to identify inclusive portions as being those portions which include a certain percentage of a total number of keywords within a particular user request.

Values may be assigned to the inclusive portions (414). For example, the portion evaluator 138 may assign values to each inclusive portion, and may store the thus-assigned values within the portion value repository 140. For example, the value assigned to inclusive portions identified with respect to a particular user request and associated set of keywords may be assigned as a weighted average, so that a total value associated with the user request may be divided by the number of keywords within the user request, so that each inclusive portion associated with the overall user request would have a value which is increased by a fractional contribution of the corresponding inclusive portion to the likelihood that the corresponding index file would be provided as part of the request results 112.

If sufficient time has not passed (416), then a system 100 may proceed with executing various user requests 108 to provide the corresponding request results 112 (410), so as to continue to thereby identify inclusive portions (412), and to thereafter assign values thereto (414). In general, an amount of time associated with the determining a sufficient length of operation with respect to operations 410-414 may be defined by an operator of the index manager 102. In general, however, it will be appreciated that criteria for establishing sufficiency of time may be set based upon maximizing an overall productivity and efficiency of the index 120.

For example, it would be efficient for the operator of the index manager 102 to select a relatively lengthy period of time to conduct the operations 410-414, so as to minimize the number of times necessary to update the index 120 (i.e., to replace the content file portions with the retained portions). On the other hand, the operator of the index manager 102 may wish to minimize the amount of time associated with the operations 410-414, so as to thereby make most efficient use of the index 120, and also to thereby provide the request results 112 to the user within an acceptable timeframe for the user.

Thus, in other words, selection of the amount of time associated with the operations 410-414 may be a matter of optimization, as would be appreciated by one of skill in the art. Further, other criteria for defining a sufficiency of the operations 410-414 may be established. For example, sufficiency may be judged based on a number of user requests and/or corresponding request results, irrespective of an amount of time necessary to provide such request results. In other implementations, some combinations of length of time and number of request results may be selected.

Once sufficient time for the operations 410-414 has passed (416), then the threshold for values assigned to the inclusive portions may be set (418). For example, the portion selector 142 may set the threshold. Although operation 418 for setting the threshold is illustrated in the example of FIG. 4 as occurring subsequent to operation 416, it may be appreciated that the threshold may be set, at least initially, at a point much earlier in the overall process 400. In these and other examples, the threshold may be set at an initial level, and may be modified or updated during execution of the various operations 402-416.

The portion selector 142 may thereafter compare values assigned to the inclusive portions with the threshold (420), and may thereafter select retained portions from the inclusive portions (422), based e.g., on whether or to what extent the values exceed the threshold.

If a size of the retained portions is acceptable (e.g., is not deemed to be too large for efficient use of the index 120) (424), then the index updater 144 may proceed with updating the index 120 to replace the inclusive portions beneath the threshold, as well as the non-inclusive portions, with the retained portions. In the example of FIG. 4, it may occur that, even after operation 422, an overall size of the retained portions to be maintained may be determined to be above a threshold associated with the index 120. In other words, as described herein, one goal of operations of the system 100 of FIG. 1 is to minimize an amount of information indexed within the index 120, while simultaneously optimizing an efficiency of the index 120 and thereby a user experience of the user.

However, it may occur, for example, if the threshold used by the portion selector 142 is too low, then an unacceptably large number of retained portions may be identified and therefore, the portion selector 142 may be configured to dynamically adjust the threshold, e.g., based on results of a previous execution of operations 402-422, and/or based on other metrics associated with operations of the index 120. Thus, as shown, if a size of the retained portions is considered to be too large (424), then the threshold may be adjusted (418), so that a number of retained portions actually used to update the index 120 may be optimized.

Various additional and alternative embodiments may be implemented, beyond those explicitly described herein. For example, as referenced above, it may occur that the index 120 is a relatively fast or expensive index, so that the index 120 may benefit from operation of the system 100 as described herein. In addition, a relatively slower or less expensive index (not explicitly illustrated) may be included in the system 100 and used to store/index an entirety of the whole content files 106 (e.g., to store/index an entirety of the content file 128).

In such implementations, the relatively slower, less expensive index may perform some of the initial filtering described above, with respect to operation 404 of FIG. 4. For example, the index builder 118 may perform an initial truncation of the whole content file 106 before indexing the content file 128 and other content files contained therein. In general, however, the inclusion of such a relatively slower, less expensive index may provide several advantages. For example, inclusion of such an index may allow an operator of the index manager 102 and the search manager 104 to conduct relatively more full/complete searches of the subject matter indexed therein, where time and resources permit.

In a particular example, it may occur that, at a given point in time, particular portions of the content files 106 are found to be very instrumental in successful completion of user requests 108. At a later point in time, however, the (current or most-recent version of the) user request 108 may have a different focus, so that other portions of the index content files may, at that point in time, become more relevant and useful in providing desirable request results 112 to the user.

For example, a particular person or event may be very topical at a given point in time, and may be included in a large number of the keywords 110. In this case, the inclusive portion 130 may frequently include the keyword 110 or related keywords, and may therefore contribute heavily to inclusion of the content file 128 within the request results 112. At a later point in time, however, the specific person or event may be less topical, while some other person or event becomes more topical and becomes more likely to be included within the user request 108. In such a case, new keywords included within the user request 108 may be frequently found within the portion 132 of the content file 128. Therefore, the system 100 may utilize the relatively slower, less expensive index described above to store/index more or all of the whole content files 106 than are stored within the index 120.

In such implementations, it may occur that operations of the system 100 (e.g., operations 202-208 of FIG. 2 or operations 402-424 of FIG. 4), may periodically be repeated or restarted using contents of the relatively slower, less expensive index. In this way, optimized results may be provided to users over time, while still minimizing consumptions of resources associated with the faster, more expensive index.

Figure 5:
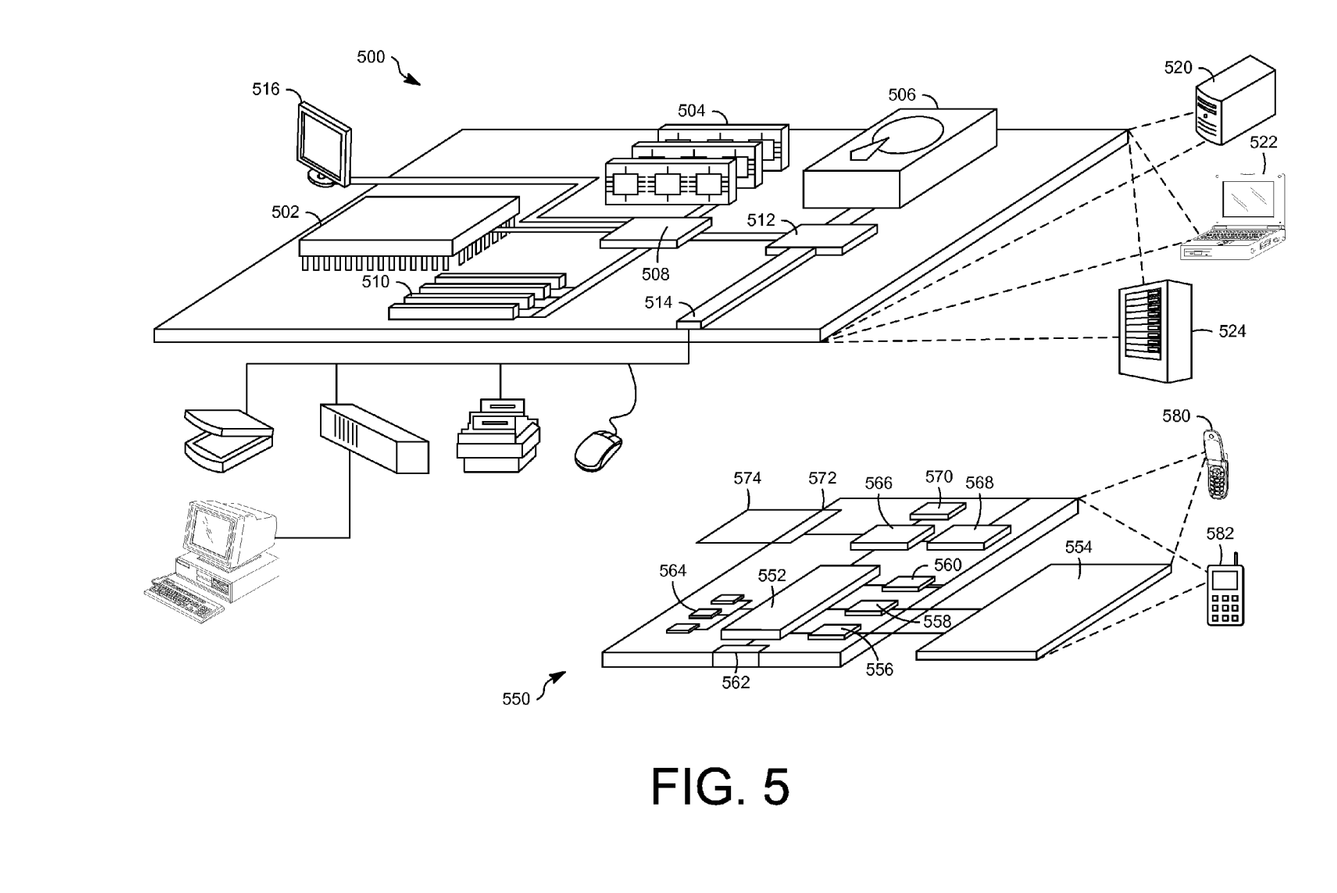
FIG. 5 is a block diagram showing example or representative computing devices and associated elements that may be used to implement the systems and methods of FIGS. 1-4.

FIG. 5 is a block diagram showing example or representative computing devices and associated elements that may be used to implement the systems of FIGS. 1 and 3. FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning system) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

What is claimed is:

1. A computer system comprising at least one processor and a computer-readable medium, instructions stored on the computer-readable medium and executable by the at least one processor, the computer system comprising:
   an index of documents including individual documents having portions;
   a request monitor configured to cause the at least one processor to monitor user requests, each user request including at least one keyword for searching the index;
   a portion evaluator configured to:
      determine inclusive portions of documents within the index based on a providing of at least one of the indexed documents to the user in response to the user request, the inclusive portions being responsive to the user request, and
      update values for the inclusive portions in response to the determining, an updated value for a specific inclusive portion representing a quantity of times the specific inclusive portion was determined to be responsive to user requests;
   a portion selector configured to select, from the inclusive portions and based on the updated values, retained portions of particular documents in the index to be retained within the index; and
   an index updater configured to update the index to replace the portions of the particular documents with the retained portions of the particular documents.

2. The computer system of claim 1, wherein the user requests include search requests provided to a search engine configured to provide search results in response thereto, using the index, and wherein the request monitor is further configured to monitor the search results.

3. The computer system of claim 1, comprising an index builder configured to provide the indexed documents within the index prior to the user requests, including executing a filtering of the documents based on content thereof.

4. The computer system of claim 3, wherein the filtering is based on one or more of a term frequency of terms within the documents, an inverse document frequency of terms within the documents, a template defining a type of content within the documents, or on positions of terms within the documents.

5. The computer system of claim 1, wherein the portion evaluator is configured to determine the document portions including defining sequential portions within each document.

6. The computer system of claim 5, wherein the documents include text-based documents, and wherein the sequential portions include continuous text elements defined by a structure of a corresponding document.

7. The computer system of claim 1 wherein the user requests include search requests provided to a search engine configured to provide search results in response thereto, the search results identifying corresponding content files by providing a snippet therefrom which includes a corresponding keyword of the at least one keyword, and wherein the portion evaluator is configured to determine the inclusive document portions using the snippets.

8. The computer system of claim 1, wherein the user request is one of a plurality of users requests, and wherein the portion evaluator is configured to update the values by increasing a corresponding value for each inclusive portion upon each occurrence of the providing in response to each user request of the plurality of user requests.

9. The computer system of claim 1, wherein the user request includes a plurality of keywords, and wherein the portion evaluator is configured to update the values by incrementing a corresponding value for each inclusive portion based upon a number of the plurality of keywords within the inclusive portion.

10. The computer system of claim 1, wherein the user request includes a plurality of keywords, and wherein the portion evaluator is configured to update the values by incrementing a corresponding value for each of a set of inclusive portions which include all of the plurality of keywords.

11. The computer system of claim 1, wherein the portion evaluator is configured to update the values including incrementing a corresponding value for each inclusive portion based on a selection of the indexed document by a user submitting the user request and in response to the providing.

12. The computer system of claim 1 wherein the portion selector is configured to select the retained portions including comparing the values with a threshold value, and thereby determining that values for the retained portions exceed the threshold value.

13. The computer system of claim 1 wherein the portion selector is configured to select the retained portions including selecting the retained portions after a pre-defined time limit during which a plurality of users requests were received.

14. The computer system of claim 1 wherein the index updater is configured to replace the indexed document portions with the retained portions, including deleting non-retained document portions of the inclusive document portions and any non-inclusive document portions.

15. The system of claim 1, wherein the index is a first index and the system further comprises a second index, the second index retaining the portions of the indexed documents after the index updater has replaced the particular documents in the first index with the retained portions.

16. A computer program product, the computer program product being tangibly embodied on a non-transitory computer-readable medium and including executable code that, when executed, is configured to cause a data processing apparatus to:
   determine, from an index of documents that includes individual documents having portions, inclusive portions of the documents, the inclusive portions being associated with at least one keyword of a user request to search the index;
   update values for the inclusive portions, based on a providing of at least one of the indexed documents to the user in response to the user request, an updated value for a specific inclusive portion representing a quantity of times the specific inclusive portion was determined to be associated with at least one keyword of user requests to search the index;
   select, from the inclusive portions and based on the updated values, retained portions of particular documents in the index to be retained within the index; and
   update the index to replace the portions of the particular documents with the retained portions of the particular documents.

17. The computer program product of claim 16, wherein the document portions include sequential portions within each content file.

18. The computer program product of claim 16, wherein the user requests include search requests provided to a search engine configured to provide search results in response thereto, the search results identifying corresponding documents by providing a snippet therefrom which includes a corresponding keyword of the at least one keyword, and wherein the inclusive document portions are determined using the snippets.

19. The computer program product of claim 16, wherein the user request is one of a plurality of users requests, and values are assigned including increasing a corresponding value for each inclusive portion upon each occurrence of the providing in response to each user request of the plurality of user requests.

20. A computer-implemented method including executing instructions stored on a computer-readable medium, the method comprising:
   storing an index of documents in a memory, the index including individual documents having portions;
   determining, using at least one processor, inclusive portions of documents within the index, the inclusive portions being associated with at least one keyword of a user request to search the index;
   updating values for the inclusive portions, based on a providing of at least one of the indexed documents to the user in response to the user request, an updated value for a specific inclusive portion representing a quantity of times the specific inclusive portion was determined to be associated with at least one keyword of user requests to search the index;
   selecting, from the inclusive portions and based on the updated values, retained portions of particular documents in the index to be retained within the index; and
   updating the index to replace the portions of the particular documents with the retained portions of the particular documents.

21. The computer-implemented method of claim 20 wherein selecting the retained portions includes selecting the retained portions including comparing the values with a threshold value, and thereby determining that values assigned to the retained portions exceed the threshold value.

22. The method of claim 20, wherein the index is a first index and the method further comprises storing a second index in a second memory, the second index retaining the portions of the indexed documents after the updating of the first index.

23. The method of claim 22, the second memory being a memory with a slower access time than the memory storing the first index.

24. A computer-implemented method comprising:
   storing an index of documents in a memory, the index including a plurality of documents having portions;
   monitoring user requests directed to the index, wherein the monitoring includes determining at least one document responsive to the request and modifying a value associated with at least one portion of the at least one document, the at least one portion being associated with a keyword from the user request, the value for the at least one portion of the at least one document representing a quantity of times the at least one portion of the at least one document was determined to be responsive to the user requests; and
   updating the index by, for at least some of the plurality of documents, replacing the respective document with selected portions of the document, the selected portions having a modified value that satisfies a threshold.

25. The method of claim 24, the modified value for a specific portion representing a number of times the specific portion was associated with a keyword.

26. The method of claim 24, wherein monitoring user requests further includes filtering the user requests so that the modifying occurs when a particular user request is determined to be useful in managing the index.

27. The method of claim 24, wherein modifying the value includes assigning a higher value to a particular portion that is associated with more than one keyword from the user request.

* * * * *